(12) United States Patent
Jiang et al.

(10) Patent No.: US 6,825,853 B2
(45) Date of Patent: Nov. 30, 2004

(54) APPARATUS AND METHOD FOR COLOR SPACE CONVERSION IN VIDEO IMAGES

(75) Inventors: Hong Jiang, Warren, NJ (US); Agesino Primatic, Jr., Frenchtown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 305 days.

(21) Appl. No.: 10/106,546

(22) Filed: Mar. 26, 2002

(65) Prior Publication Data

US 2003/0184559 A1 Oct. 2, 2003

(51) Int. Cl.[7] .................................. G09G 5/02
(52) U.S. Cl. ................ 345/604; 345/600; 345/644; 348/441; 348/444; 382/162; 382/167
(58) Field of Search ................. 345/604, 600, 345/644; 348/441, 444; 382/162, 167

(56) References Cited

U.S. PATENT DOCUMENTS

| | | | | |
|---|---|---|---|---|
| 5,450,500 A | * | 9/1995 | Brett ........................... | 382/162 |
| 5,946,113 A | | 8/1999 | Pritchett | |
| 6,049,399 A | | 4/2000 | Shyu | |
| 6,157,415 A | * | 12/2000 | Glen ........................... | 348/599 |
| 6,239,886 B1 | | 5/2001 | Klassen et al. | |
| 6,310,659 B1 | * | 10/2001 | Glen ........................... | 348/589 |
| 6,510,242 B1 | * | 1/2003 | Westerman ................. | 382/162 |
| 6,686,971 B2 | * | 2/2004 | Oh .............................. | 348/649 |

\* cited by examiner

Primary Examiner—Matthew C. Bella
Assistant Examiner—Po Wei Chen

(57) ABSTRACT

Color space conversion from a first image definition scheme to a second image definition scheme is realized by utilizing only one step of matrix multiplication and by determining whether determined RGB values are in a valid RGB region and, if not, generating a first modification factor to bring the RGB vector onto or in close proximity to the boundary of the valid RGB region. Then, the first modification factor is employed to modify in a prescribed manner the converted chroma values. In a specific embodiment of the invention, only a single matrix multiplication is employed and the otherwise additional required multiplication and/or division steps are realized by additions and/or subtractions and by employing a prescribed iterative process to bring the RGB values into or close to the valid RGB color space region. The converted chroma values are also modified by associated second modification factors also generated in the iteration process. In another specific embodiment of the invention, the converted chroma values are modified or not during an iteration depending upon whether a factor corresponding to and related to $R_0, G_0, B_0$ is within a specific color space region or not. If $R_0, G_0, B_0$ are within the specific color space region, the chroma values are modified by the associated second modification factors, the second modification factors are adjusted and the process is iterated. If $R_0, G_0, B_0$ are other than within the specific color space region, the chroma values are not modified, the second modification factors are adjusted and the process is iterated. A prescribed number of iterations are used.

16 Claims, 3 Drawing Sheets

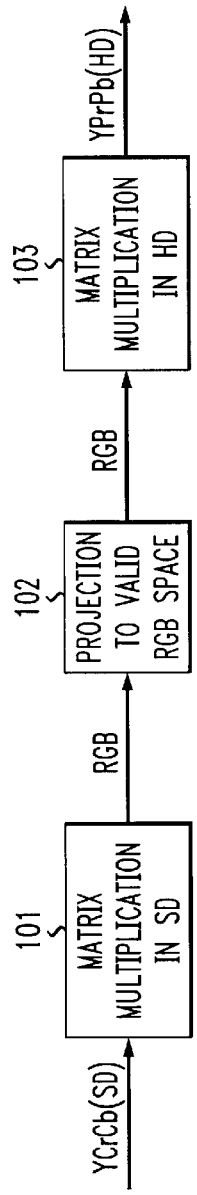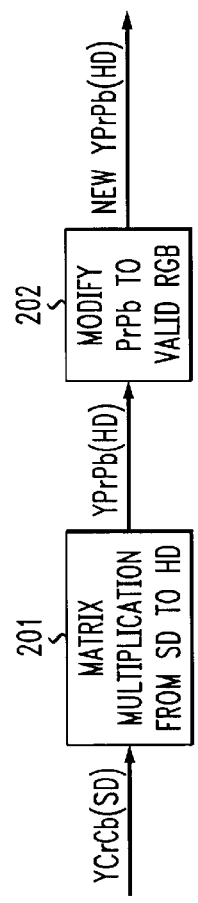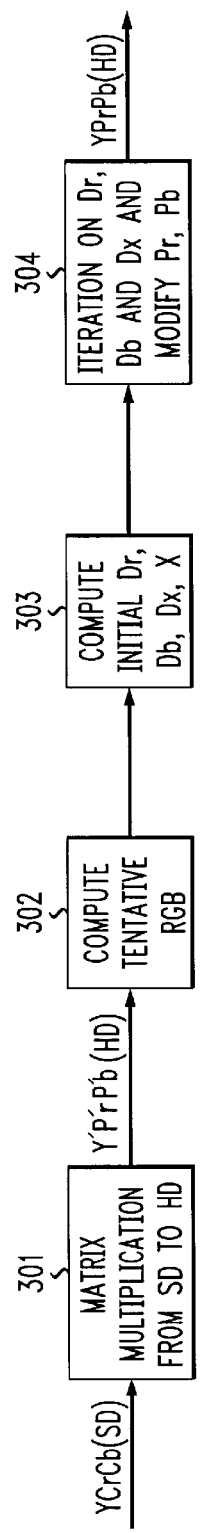

APPARATUS AND METHOD FOR COLOR SPACE CONVERSION IN VIDEO IMAGES

TECHNICAL FIELD

This invention relates to television systems and, more particularly, to color space conversion.

BACKGROUND OF THE INVENTION

The color space Y, Cr and Cb have different representations in Standard Definition (SD) television (TV) and High Definition (HD) TV. Specifically, color space is defined in the International Telecommunications Union (ITU) Recommendation ITU-R BT.601. It is noted that Y is a luma component and that Cr and Cb are color difference signals, typically associated with SDTV. YPrPb are similar color space values, typically associated with HDTV. RGB are color space values for red (R), green (G) and blue (B), respectively.

Proper color space conversions are required in, for example, up-converters where SD images are converted to HD images. To this end, standards have been promulgated to specify these conversions. Specifically, the Society of Motion Picture and TV Engineers (SMPTE) has defined such standards, namely, SMPTE125M specifies a matrix converting RGB values to YCrCb values and their valid region for SDTV, and SMPTE274M specifies the conversion for HDTV.

Prior arrangements are known which convert the SD YCrCb values into HD YPrPb values. One such prior arrangement is shown in FIG. 1, which includes matrix multiplier 101 that generates tentative RGB values in response to the YCrCb SD values. These tentative RGB values may be invalid in that one or more of them is outside a prescribed color space region. Consequently, unit 102 is needed to project the invalid tentative RGB values to valid RGB color space within the prescribed valid region. The resulting valid RGB values are supplied to matrix multiplier 103, which yields the desired HD YPrPb values.

A problem with such prior arrangements is their use of the multiple matrix multipliers and/or lookup tables to realize the matrix multiplications required by the SMPTE standards noted above. Some implementations also require one or more division steps, which are very undesirable, especially in hardware implementations. In hardware implementations, for example, as an integrated circuit, such operations take up significant chip space, while in software implementations the processes are long and time consuming, thereby requiring more powerful high speed processors to effect them rapidly.

SUMMARY OF THE INVENTION

These and other problems and limitations are overcome in an embodiment of the invention in converting from a first image definition scheme to a second image definition scheme by utilizing only one step of matrix multiplication and by determining whether determined RGB values are in a valid RGB region and, if not, generating a first modification factor to bring the RGB vector onto or in close proximity to the boundary of the valid RGB region. Then, the first modification factor is employed to modify in a prescribed manner the converted chroma values.

In a specific embodiment of the invention, only a single matrix multiplication is employed and the otherwise additional required multiplication and/or division steps are realized by additions and/or subtractions and by employing a prescribed iterative process to bring the RGB values into or close to the valid RGB color space region. The converted chroma values are also modified by associated second modification factors also generated in the iteration process.

In another specific embodiment of the invention, the converted chroma values are modified or not during an iteration depending upon whether a factor corresponding to and related to $R_0$, $G_0$, $B_0$ is within a specific color space region or not. If $R_0$, $G_0$, $B_0$ are within the specific color space region, the chroma values are modified by the associated second modification factors, the second modification factors are adjusted and the process is iterated. If $R_0$, $G_0$, $B_0$ are other than within the specific color space region, the chroma values are not modified, the second modification factors are adjusted and the process is iterated. A prescribed number of iterations are used.

BRIEF DESCRIPTION OF THE DRAWING

FIG. 1 shows a prior art color space converter;

FIG. 2 illustrates a color space converter in accordance with the invention;

FIG. 3 depicts a specific embodiment on a color space converter in accordance with the invention;

DETAILED DESCRIPTION

Theoretical Discussion

Figure 4:
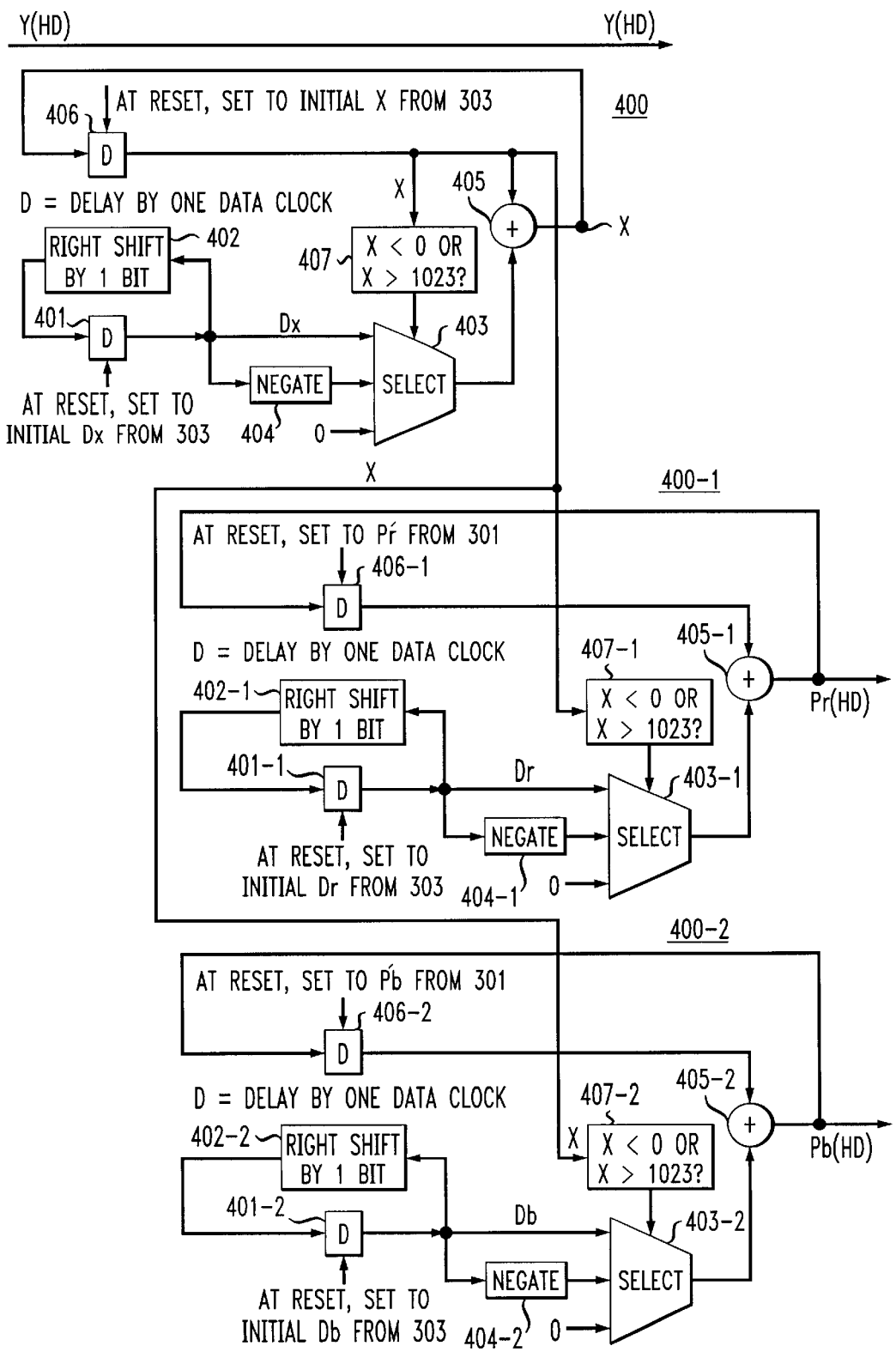
FIG. 4 shows one embodiment of the iteration and modification unit 304 employed in the embodiment of the invention shown in FIG. 3.

Color space has different representations for standard definition television (SDTV) and for high definition television (HDTV), namely, Y, Cr and Cb for SDTV and Y, Pr and Pb for HDTV. Proper color space conversions are required in converters when SDTV images are converted to HDTV images and vice versa.

In this discussion, the following notation will be employed. Y is a luma component and Cr and Cb are chroma components, i.e., color difference signals, as are Pr and Pb. RGB are color space values for red, green and blue, respectively. Y's, C'r and C'b are Y, Cr and Cb, respectively, in SDTV properly scaled to a color space region of [0,1] for Y's and a color space region of [−0.5,0.5] for C'r and C'b. Y'h, P'b and P'b are the luma and chroma components in HDTV properly scaled to the same color space ranges as the SDTV components. Color space values r, g and b are the RGB gamma precorrected values in the color space region [0,1]. Ysd, Yhd and R are column vectors, namely, Ysd=tr[Y's, C'r, C'b], Yhd=tr[Y'h, P'r, P'b] and R=tr[r, g, b]. Note that the bold type denotes a vector.

Standard SMPTE125M specifies the color space conversion for SDTV as $$Ysd = Ms \cdot R = \begin{bmatrix} 0.299 & 0.587 & 0.144 \\ 0.500 & -0.419 & -0.081 \\ -0.169 & -0.331 & 0.500 \end{bmatrix} \cdot R. \quad (1)$$

Standard SMPTE274M specifies the color space conversion for HDTV as $$Yhd = Mh \cdot R = \begin{bmatrix} 0.2126 & 0.7152 & 0.0722 \\ 0.5000 & -0.4542 & -0.0458 \\ -0.1146 & -0.3854 & 0.5000 \end{bmatrix} \cdot R. \quad (2)$$

In an up-converter, the color space conversion is effected as $$Ysd = Mh \cdot R \quad (3)$$

$$= Ms^{-1} \cdot Ysd$$

$$= \begin{bmatrix} 1.0000 & -0.2127 & -0.1181 \\ 0.0 & 1.0251 & 0.0744 \\ 0.0 & 0.1152 & 1.0187 \end{bmatrix} \cdot Ysd.$$

Similarly, in a down-converter for converting HDTV images to SDTV images the color space conversion is effected as $$Ysd = Ms \cdot R \quad (4)$$

$$= Ms \cdot Mh^{-1} \cdot Yhd$$

$$= \begin{bmatrix} 1.0000 & 0.1961 & 0.1016 \\ 0.0 & 0.9835 & -0.0718 \\ 0.0 & -.01112 & 1.0187 \end{bmatrix} \cdot Yhd.$$

In both the up-conversion and the down-conversion it is possible that a set of valid YCrCb color space values can produce invalid RGB values, that is, r, g, b values outside of the color space region [0,1]. The proper handling of such invalid RGB values is required. Taking the up-conversion as an example, if a set of RGB values is outside the unit cube $[0,1]^3$, then Yh, P'r and P'b need to be modified so that the corresponding RGB values are valid. The modification is such that Yh remains the same, and new values for P'r and P'b are moved toward the origin (0,0) in the unit cube in a straight line until the values of RGB become valid.

Now the relationship between YCrCb and RGB values is considered regardless of whether the application is up-conversion or down-conversion. The basic formulation is as follows. Given a YCrCb vector Y=tr[Y', C'r, C'b], its corresponding RGB vector is R=tr[r, g, b]. M denotes the matrix transform between YCrCb and RGB, i.e., Y=M*R, where M=Ms for SDTV and M=Mh for HDTV. Note that the region of Y is assumed to be [0,1 ] for Y' and [−0.5,0.5] for C'r and C'b. For a given Y vector, the corresponding R vector may or may not be in the valid space $[0,1]^3$. If vector R is not in valid space, then vector Y needs to be modified to yield valid RGB values. The modification is such that Y' is held unchanged, but chroma Cr and Cb are moved toward the origin in the valid space until vector R becomes valid. This defines a new vector Ynew=tr[Y, Cr, Cb] such that $$Y=Y', Cr=xC'b, Cb=xC'b, x \text{ in } [0,1], \quad (5)$$

where x is chosen so that the new RGB vector $M^{-1}$ Ynew lies on the boundary of $[0,1]^3$.

The RGB values corresponding to vector Ynew are obtained by applying the inverse of the matrix M, namely, $$Rnew = \begin{bmatrix} R \\ G \\ B \end{bmatrix} \quad (6)$$

$$= M^{-1}\left(\begin{bmatrix} Y' \\ 0 \\ 0 \end{bmatrix} + \begin{bmatrix} 0 \\ xC'r \\ xC'b \end{bmatrix}\right)$$

$$= M^{-1}\begin{bmatrix} Y' \\ 0 \\ 0 \end{bmatrix} + xM^{-1}\begin{bmatrix} 0 \\ C'r \\ C'b \end{bmatrix}$$

$$= \begin{bmatrix} R_0 \\ G_0 \\ B_0 \end{bmatrix} + x\begin{bmatrix} R_1 \\ G_1 \\ B_1 \end{bmatrix}$$

where x is in the region [0,1].

From equation (5), it is seen that the value of x=0 represents a gray color. Therefore, Rnew is always valid for x=0, regardless of Y', C'r and C'b. If the values of Y', C'r and C'b generate invalid RGB values, i.e., if Rnew is invalid when x=1, then it is clear that there exists a value in the space region (0,1) such that Rnew lies on the boundary of the valid RGB space value region $[0,1]^3$. This value of x can be determined as follows. Since Rnew is invalid, there must be one value of R, G and B that is outside the space region [0,1] for x=1. Assume that the R value is outside of [0,1] for x=1. Note that if more than one value is outside of [0,1] anyone of them can be used. Then, from equation (6), for x=1, $R=R_0+R_1$, where $R_0$, $R_1$ are defined in equation (6). Then either $R_0+R_1<0$, or $R_0+R_1>1$. In the former case, there is a modification factor value of x in (0,1) such that $R_0+xR_1=0$. Similarly, if $R_0+R_1>1$, then there is an x in (0,1) such that $R_0+xR_1=1$. Therefore, the value of x can be determined by $$x = \frac{p - R_0}{R_1}, \text{ where } p = 0 \text{ if } R_0 + R_1 < 0, \text{ and } p = 1 \text{ if } R_0 + R_1 > 1. \quad (7)$$

From equation (7), the modified values of C'r and C'b can be computed via equation (5).

An example of the specific case of up-conversion is considered for conversion from SDTV to HDTV images. For a given SD luma/chroma vector Ysd, equation (3) can be used to obtain the luma/chroma vector in HD. It is possible for Ysd to produce invalid RGB values, due to, for example, the interpolation of chroma values. In such instances, resulting vector Yhd needs to be modified in accordance with the procedures noted above to obtain a new vector Yhdnew which is in the form of equation (5), namely, $$Y=Y'h, Pr=xP'r, Pb=xP'b, x \text{ in } [0,1]. \quad (8)$$

Then, applying equation (6) to HD results in $$Rnew = \begin{bmatrix} R \\ G \\ B \end{bmatrix} = (Mh)^{-1} Yhdnew = (Mh)^{-1}\left(\begin{bmatrix} Y'h \\ 0 \\ 0 \end{bmatrix} + \begin{bmatrix} 0 \\ xP'r \\ xP'b \end{bmatrix}\right). \quad (9)$$

From equation (3), it is seen that Y'h is the first component of vector $Mh*(Ms)^{-1}$, resulting in $$\begin{bmatrix} Y'h \\ 0 \\ 0 \end{bmatrix} = E_1 \cdot Mh \cdot Ms^{-1} \cdot Ysd, \text{ where } E_1 = \begin{bmatrix} 1 & 0 & 0 \\ 0 & 0 & 0 \\ 0 & 0 & 0 \end{bmatrix}. \quad (10)$$

Similarly, $$\begin{bmatrix} 0 \\ P'h \\ P'r \end{bmatrix} = E_2 \cdot Mh \cdot Ms^{-1} \cdot Ysd, \text{ where } E_2 = \begin{bmatrix} 0 & 0 & 0 \\ 0 & 1 & 0 \\ 0 & 0 & 1 \end{bmatrix}. \quad (11)$$

Combining equations (9), (10) and (11) yields $$Rnew = \begin{bmatrix} R \\ G \\ B \end{bmatrix} = \begin{bmatrix} R_0 \\ G_0 \\ B_0 \end{bmatrix} + x \begin{bmatrix} R_1 \\ G_1 \\ B_1 \end{bmatrix}, \quad (12)$$

where $\begin{bmatrix} R_0 \\ G_0 \\ B_0 \end{bmatrix} = Mh^{-1} \cdot E_1 \cdot Mh \cdot Ms^{-1} \cdot Ysd$ (13)

and $\begin{bmatrix} R_1 \\ G_1 \\ B_1 \end{bmatrix} = Mh^{-1} \cdot E_2 \cdot Mh \cdot Ms^{-1} \cdot Ysd.$ (14)

Employing equations (1) and (2), the matrices for equations (13) and (14) are $$\begin{bmatrix} R_0 \\ G_0 \\ B_0 \end{bmatrix} = \begin{bmatrix} 1.0000 & -0.2127 & -0.1181 \\ 1.0000 & -0.2127 & -0.1181 \\ 1.0000 & -0.2127 & -0.1181 \end{bmatrix} \cdot Ysd \quad (15)$$

$$= \begin{bmatrix} Y's & -0.2127C'r & -0.1181C'b \\ Y's & -0.2127C'r & -0.1181C'b \\ Y's & -0.2127C'r & -0.1181C'b \end{bmatrix}$$

and $$\begin{bmatrix} R_1 \\ G_1 \\ B_1 \end{bmatrix} = \begin{bmatrix} 0.0 & 1.6144 & 0.1171 \\ 0.0 & -0.5015 & -0.2256 \\ 0.0 & 0.2137 & 1.8902 \end{bmatrix} \cdot Ysd \quad (16)$$

$$= \begin{bmatrix} 1.6144C'r & +0.1171C'b \\ -0.5015C'r & -0.2256C'b \\ 0.2137C'r & 1.8902C'b \end{bmatrix}.$$

In the above formulations, all values have been normalized to unity. That is the RGB and luma values have been scaled to [0,1] and the chroma values have been scaled to [−0.5,0.5]. Now the integer values will be considered. In both the SMPTE125M and SMPTE274M standards, the 10 bit luma and chroma values are restricted to [64,940] and [64,960], respectively. Notations Ys, Cr and Cb are used for the integer values in SD and notations Yh, Pr and Pb are used for the integer values in HD. 10 bits are also used to represent the RGB values, within a region [0,1023]. Then, equation (3) for converting SD and HD becomes $$\begin{bmatrix} Yh \\ Pr \\ Pb \end{bmatrix} = \begin{bmatrix} 64 \\ 512 \\ 512 \end{bmatrix} + \begin{bmatrix} 1.0000 & -0.2127 & -0.1181 \\ 0.0 & 1.0251 & 0.0744 \\ 0.0 & 0.1152 & 1.0187 \end{bmatrix} \cdot \begin{bmatrix} Ys - 64 \\ Cr - 512 \\ Cb - 512 \end{bmatrix}. \quad (17)$$

The 10 bit equivalents of equations (15) and (16) become $$\begin{bmatrix} R_0 \\ G_0 \\ B_0 \end{bmatrix} = \begin{bmatrix} 1.1678 & -0.2429 & -0.1348 \\ 1.1678 & -0.2429 & -0.1348 \\ 1.1678 & -0.2419 & -0.1348 \end{bmatrix} \cdot \begin{bmatrix} Ys - 64 \\ Cr - 64 \\ Cb - 64 \end{bmatrix} \quad (18)$$

and $$\begin{bmatrix} R_1 \\ G_1 \\ B_1 \end{bmatrix} = \begin{bmatrix} 0.0 & 1.8432 & 0.1337 \\ 0.0 & -0.5725 & -0.2576 \\ 0.0 & 0.2440 & 2.1581 \end{bmatrix} \cdot \begin{bmatrix} Ys - 64 \\ Cr - 64 \\ Cb - 64 \end{bmatrix}. \quad (19)$$

Equation (8) is equivalent to

Yhnew=Yh, Prnew=512+x(Pr−512), Pbnew=512+x(Pr−512), (20)

where x is determined as follows.

$$x = \begin{cases} 1, & \text{if } 0 \leq (X_0 + X_1) \leq 1023, \text{ for all } X = R, G, B \\ \dfrac{p - X_0}{X_1}, & \text{if } 0 \leq (X_0 + X_1) < 0, \text{ or if } (X_0 + X_1) > 1023, \text{ for some } X = R, G, B, \end{cases} \quad (21)$$

where p=0 if $X_0+X_1<0$, and p=1023 if $X_0+X_1>1023$. Note that X is a correction factor, $X_0$ is an initial correction factor and $X_1$ is a first correction factor after the initial one.

The value x as set forth in equation (21) needs to have a prescribed accuracy. This degree of accuracy, i.e., number of iterations required, is determined as follows.

The value of x determine via equation (21) is employed in equation (20) to obtain modified values of Pr and Pb. To this end, let x be the exact value given by equation (21) and x' be an approximation. Then, x'=x+e, where e is the error in the approximation. (22)

Substituting equation (22) into equation (20), yields the error in Pr and Pb due to the use of x' instead of x as Error in Py=e(Py−512), where y is r or b. (23)

Since |Py−512|<512, the error in chroma is bounded by

|Error in Py|≦512|e|. (24)

Therefore, if $|e|<2^{-9}$, then the error in the determination of Pr or Pb via equation (20) will be less than one (1) LSB (least significant bit). This indicates that the value of x in equation (22) only needs to be computed to an accuracy of $2^{-9}$. That is, x only needs to have nine (9) bits after the binary point and, hence, only nine (9) iterations are required.

Embodiments of the Invention

A first process for efficiently realizing the SD to HD color space conversion is set forth below. Thus, for a given set of SD luma and chroma, i.e., Ys, Cr and Cb, do the following:

601—Determine Yh, Pr and Pb via equation (17) (note that the coefficients need to be quantized).

602—Determine $R_0$, $G_0$, $B_0$ and $R_1$, $G_1$, $B_1$ via equation (18) and equation (19), respectively. Note that $R_0=G_0=B_0$.

603—If $0 \leq (X_0+X_1) \leq 1023$ for all X=R, G, B then STOP, else go to step 604.

604—Let X be one of R, G, B, such that $(X_0+X_1)<0$, or $(X_0+X_1)>1023$.

Let p=0 if $(X_0+X_1)<0$, and p=1023 if $(X_0+X_1)>1023$. Determine $$x = \frac{p - X_0}{X_1},$$

where x is a first modification factor.

605—Determine new modified chroma values 512+x(Pr−512) and 512+x(Pb−512).

The above first process may be effected employing the embodiment shown in FIG. 2. As shown, the SD YCrCb luma and chroma values are supplied to unit 201 where a single matrix multiplication is effected via equation (17) to obtain tentative HD YPrPb values (601). Then, the tentative values are modified, if required, in unit 202 to obtain the new HD YPrPb luma and chroma values (602 through 605). It should be noted that this first process may be suitable for software implementation but not very suitable for hardware implementation primarily due the multiplication and the division steps that are required.

The undesirable use of the division and multiplications in steps 604 and 605 in the above embodiment need to be avoided. This is realized, in accordance with an aspect of the invention, by making an approximation of the value of the factor "x" through a plurality of iterations of its approximation x', instead of trying to determine it in a single step as is done in step 604 above. This is done as follows;

a) Starting with x=1.

b) At each iteration determine the RGB values using $$\begin{bmatrix} R \\ G \\ B \end{bmatrix} = \begin{bmatrix} R_0 \\ G_0 \\ B_0 \end{bmatrix} + x \begin{bmatrix} R_1 \\ G_1 \\ B_1 \end{bmatrix} \text{ from equation (6)}.$$

c) Test to determine if each of R, G, B is in color space region [0,1023].

d) If one of R, G, B is outside color space region [0,1023], decrease the value of x by one half its value (note that R, G, B must inside region [0,1023] when x=0).

e) If all of R, G, B are inside region [0,1023], increase the value of x by one half its value.

f) Iterate steps c–e until either
   1) R, G, B happen to be on the boundary of the valid region, or
   2) a prescribed number of iterations have been completed to realize the desired accuracy for x.

Thus, it is seen that through the iterations of steps c–e the RGB vector is getting closer and closer to the boundary of the valid region. Each iteration gains one bit in the accuracy of x. Note that as indicated above for a particular application, it was enough for x to have nine (9) bits of accuracy. Consequently, only nine (90 iterations of steps c–e are required.

The above process, i.e., including steps a–e above, demonstrates how to determine an approximation for the value of x without doing division. It, however, turns out that there is no need to explicitly determine the value of x and then do the multiplications in step 605 above. The multiplications can be carried out as part of the process including step a–e above. For example, the value of 512+x(Pr−512) can be obtained while the value of x is being determined. To this end, the process starts with P=512+x(Pr−512)=Pr. In the iteration process, if x is decreased, P is also decreased by an appropriate amount. Similarly, if x is increase, P is increased by an appropriate amount. Then, at the end of the iterations, P is also at its desired value. Therefore, the modified chroma values are at their desired values at the end of the process.

A second efficient process for realizing the SD to HD color space conversion is described as follows.

701—Determine Yh, Pr and Pb via equation (17) (note that the coefficients need to be quantized). These are tentative values Y'P'rP'b.

702—Determine $R_0$, $G_0$, $B_0$ and $R_1$, $G_1$, $B_1$ via equation (18) and equation (19), respectively. Note that $R_0=G_0=B_0$.

703—Let $R=R_0+R_1$, $G=G_0+G_1$, $B=B_0+B_1$.

704—If R, G, B as defined in step 703 are all in region [0,1023], then STOP, else go to step 705.

$$705 - \text{Let } Dr = \frac{Pr - 512}{2} \text{ and } Db = \frac{Pb - 512}{2}.$$

Let X be one of R, G, B that is outside the region [0,1023].

$$\text{Let } Dx = \frac{X_1}{2},$$

where $X_1$ is that corresponding to $R_1$, $G_1$, $B_1$.

706—Iterate steps 706.1 and 706.2 for nine (9) iterations.

706.1—If X<0 or X>1023 (outside of region [0,1023]), then

Pr(HD)=Pr−Dr, Pb(HD)=Pb−Db, X'=X−Dx else if 0<X<1023 (inside of region [0, 1023], but not on the boundary)

Pr(HD)=Pr+Dr, Pb(HD)=Pb+Db, X'=X+Dx.

$$706.2 - \text{Let } Dx = \frac{Dx}{2}, Dr = \frac{Dr}{2}, Db = \frac{Db}{2}.$$

The above second process for effecting the SD to HD color space conversion may be realized employing the embodiment shown in FIG. 3 and FIG. 4. As shown in FIG. 3, SD, YCrCb values are supplied to unit 301 where a single matrix multiplication from SD to HD is performed via equation (17) to determine the tentative HD Y'P'rP'b values (701). HD Y'P'rP'b values are supplied to unit 302 which determines tentative RGB values in accordance with equation (18) and equation (19) (702, 703). If the tentative RGB values are with the valid region [0,1023], in this example, the tentative HD Y'P'rP'b are used (704). If not, unit 303 determines the initial values for Dr, Db, Dx and X (705). Then, in unit 304 iterations are made on Dr, Db and Dx and the HD chroma Pr and Pr values are modified accordingly (706.1 and 706.2). It is noted that in units 302, 303 and 304 that there is no modification of the HD luma Y value. Further, note that luma Y occurs for each pixel in the image while chroma Cr and Cb occur alternately every second horizontal pixel, i.e., YCr (pixel 1), YCb (pixel 2), YCr (pixel 3), YCb (pixel 4), etc.

FIG. 4 shows details of unit 304. As indicated, Y(HD) in is Y(HD) out of unit 304. Values for X (X'), Pr(HD) and Pb(HD) are obtained on an iterative basis via iteration units 400, 400-1 and 400-2, respectively, where in this example the number of iterations is nine (9). Each of units 400, 400-1 and 400-2 are structurally and operationally essentially the same. Thus, unit 400 includes delay unit 401 having a delay of one data clock and which is initially set to an initial value of Dx from unit 303 associated with the incoming YCrCb values. The initial Dx is supplied as an output from delay 401 on the next data clock and is supplied to right shift unit 402, one input of selector 403 and to negate unit 404. Right shift unit 402 shifts the digital value of Dx one (1) bit to the right, which effects a divide by 2 function, i.e., Dx/2. In turn, the Dx/2 value is supplied as an input to delay 401 where it is delayed by one data clock. Also, supplied as inputs to selector 403 are the current −Dx value from negate unit 404 and a logical 0 value. Thus, either Dx, −Dx or logical 0 is supplied via selector 403 to an input of summer 405. The value supplied from selector 403 to summer 405 is dependent on the value of X supplied to comparator 407. If X<0 or X>1023, X is outside the valid region and selector 403 is controlled to select −Dx; if 0<X<1023, X is inside the valid region and selector 403 is controlled to select Dx; and if X=0 or X=1023, X is on the boundary of the valid region and selector 403 is controlled to select logical 0. The value of X supplied as an input to comparator unit 407 is that from delay 406. Delay 406 is supplied at reset with an initial value of X from unit 303 (FIG. 3). This initial value of X is supplied on a next data clock as an output from delay 406 to an input of summer 405 and to comparators 407, 407-1 and 407-2. The output from summer 405 is supplied to an input of delay 406 and, in turn, the output from delay 406 is supplied to each of comparators 407, 407-1 and 407-2. Additionally, after nine (9) iterations, in this example, the output from summer 405 is X'. Operation of iteration unit 400-1 is essentially the same as for iteration unit 400, discussed above, except of a few differences. The differences between units 400 and 400-1 being that an initial value of Dr from unit 303 is supplied to delay 401-1 at reset, Dr and −Dr are supplied as inputs to selector 403-1, an initial value of P'r from unit 301 is supplied to delay 406-1 at reset, either Dr, −Dr or logical 0 are selected as an output from selector 403-1 and along with P'r as inputs to summer 405-2 and the output from summer 405-1 is Pr(HD), after completion of the nine (9) iterations.

Similarly, operation of iteration unit 400-2 is essentially the same as for iteration unit 400, discussed above, except of a few differences. The differences between units 400 and 400-2 being that an initial value of Db from unit 303 is supplied to delay 401-2 at reset, Db and −Db values are supplied to selector 403-2, an initial value of P'b from unit 301 is supplied to delay 406-2 at reset, either Db, −Db or logical 0 are selected as an output from selector 403-2 and along with P'b as inputs to summer 405-2 and the output from summer 405-2 is Pb(HD), after completion of the nine (9) iterations.

In the operation of the embodiment of unit 304 shown in FIG. 4, both addition and subtraction is required to generate the desired values by using the process described in steps 701 through 706.2, as discussed above. A more efficient third process is one in which the subtractions are eliminated. This more efficient third process is as follows:

801—Determine Yh, Pr and Pb via equation (17) (note that the coefficients need to be quantized). These are tentative values Y'P'rP'b.

802—Determine $R_0$, $G_0$, $B_0$ and $R_1$, $G_1$, $B_1$, via equation (18) and equation (19), respectively. Note that $R_0=G_0=B_0$.

803—Let $R=R_0+R_1$, $G=G_0+G_1$, $B=B_0+B_1$.

804—If R, G, B as defined in step 803 are all in region [0,1023], then STOP, else go to step 805.

$$805 - \text{Let } Dr = \frac{Pr - 512}{2} \text{ and } Db = \frac{Pb - 512}{2}.$$

Let X be one of R, G, B that is outside the region [0,1023].

$$\text{Let } Dx = \frac{X_1}{2},$$

where $X_1$ is that corresponding to $R_1$, $G_1$, $B_1$.

806—Iterate steps 806.1 and 806.2 for nine (9) iterations.

806.1—If 0<X+Dx<1023 (inside of region [0,1023], but not on the boundary), then

Pr(HD)=Pr+Dr,Pb(HD)=Pb+Db,X'=X+Dx else

Pr(HD)=Pr,Pb(HD)=Pb,X'=X.

$$806.2 - \text{Let } Dx = \frac{Dx}{2}, Dr = \frac{Dr}{2}, Db = \frac{Db}{2}.$$

Figure 5:
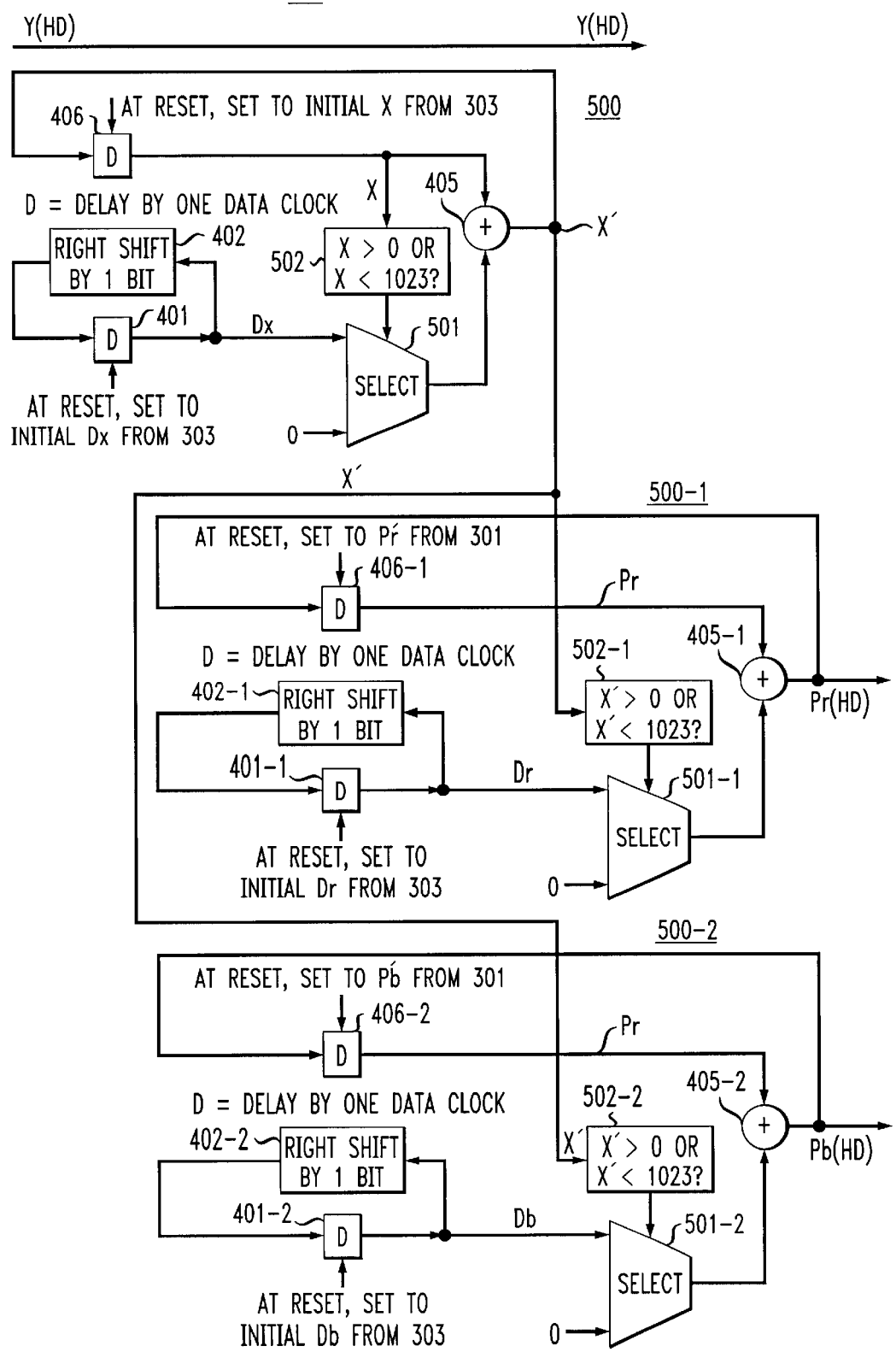
FIG. 5 illustrates another embodiment of the iteration and modification unit 304 employed in the embodiment of the invention shown in FIG. 3.

The above third process may be effected employing the embodiment shown in FIG. 3 and FIG. 5. As shown in FIG. 3, SD YCrCb values are supplied to unit 301 where a single matrix multiplication from SD to HD is performed via equation (17) to determine the tentative HD Y'P'rP'b values (801). HD Y'P'rP'b values are supplied to unit 302 which determines tentative RGB values in accordance with equation (18) and equation (19) (802, 803). If the tentative RGB values are with the valid region [0,1023], in this example, the tentative HD Y'P'rP'b are used (804). If not, unit 303 determines the initial values for Dr, Db, Dx and X (805). Then, in unit 304 iterations are made on Dr, Db and Dx and the HD chroma Pr and Pr values are modified accordingly (806.1 and 806.2). It is noted that in units 302, 303 and 304 that there is no modification of the HD luma Y value. Further, note that luma Y occurs for each pixel in the image while chroma Cr and Cb occur alternately every second horizontal pixel, i.e., YCr (pixel 1), YCb (pixel 2), YCr (pixel 3), YCb (pixel 4), etc.

FIG. 5 shows details of unit 304. As indicated, Y(HD) in is Y(HD) out of unit 304. Values for X (X'), Pr(HD) and Pb(HD) are obtained on an iterative basis via iteration units 500, 500-1 and 500-2, respectively, where in this example the number of iterations is nine (9). Each of units 500, 500-1 and 500-2 are structurally and operationally essentially the same. Thus, unit 500 includes delay unit 401 having a delay of one data clock and which is initially set to an initial value of Dx from unit 303 associated with the incoming YCrCb values. The initial Dx is supplied as an output from delay 401 on the next data clock and is supplied to right shift unit 402, and one input of selector 501. Right shift unit 402 shifts the digital value of Dx one (1) bit to the right, which effects a divide by 2 function, i.e., Dx/2. In turn, the Dx/2 value is supplied as an input to delay 401 where it is delayed by one data clock. Also supplied as an input to selector 501 is a logical 0 value. Thus, either Dx or logical 0 is supplied via selector 501 to an input of summer 405. The value supplied from selector 501 to summer 405 is dependent on the value of X supplied to comparator 407. If 0<X<1023, X is inside the valid region and selector 501 is controlled to select Dx; and if X≦0 or X≧1023, X is on or outside the boundary of the valid region and selector 501 is controlled to select logical 0. The value of X supplied as an input to comparator unit 502 is that from delay 406. Delay 406 is supplied at reset with an initial value of X from unit 303 (FIG. 3). This initial value of X is supplied on a next data clock as an output from delay 406 to an input of summer 405 and to comparator 502. The output from summer 405 after nine (9) iterations, in this example, is X', where X'=X+Dx, when Dx is selected and X'=X, when logical 0 is selected, and is supplied to iteration units 500-1 and 500-2 and, therein, to comparator 502-1 and 502-2, respectively.

Operation of iteration unit 500-1 is essentially the same as for iteration unit 500, discussed above, except of a few differences. The differences between units 500 and 500-1 being that X' is supplied to comparator 502-1, an initial value of Dr from unit 303 is supplied to delay 401-1 at reset, Dr value is supplied as an input to selector 501-1, an initial value of P'r from unit 301 is supplied to delay 406-1 at reset, either Dr or logical 0 are selected as an output from selector 501-1 and along with P'r as inputs to summer 405-2 and the output from summer 405-1 is Pr(HD), after completion of the nine (9) iterations.

Similarly, operation of iteration unit 500-2 is essentially the same as for iteration unit 500, discussed above, except of a few differences. The differences between units 500 and 500-2 being that X' is supplied to comparator 502-2, an initial value of Db from unit 303 is supplied to delay 401-2 at reset, Db value is supplied to selector 501-2, an initial value of P'b from unit 301 is supplied to delay 406-2 at reset, either Db or logical 0 are selected as an output from selector 502-2 and along with P'b as inputs to summer 405-2 and the output from summer 405-2 is Pb(HD), after completion of the nine (9) iterations.

It is noted that most of the discussion above is centered about converting from SD to HD. It will be apparent to those skilled in the art that the embodiments described above can equally be utilized to effect a color space conversion from HD to SD, i.e., a so-called down conversion. To this end the matrix multiplication in, for example, unit 201 in FIG. 2 and 301 in FIG. 3 would be that of equation (4). Equation (4) readily yields a 10 bit representation similar to equation (17) for the down conversion from HD to SD.

Moreover, the above-described embodiments are, of course, merely illustrative of the principles of the invention. Indeed, numerous other methods or apparatus may be devised by those skilled in the art without departing from the spirit and scope of the invention.

We claim:

1. A method for use in color space conversion between first definition images and second definition images comprising the steps of:

in response to a first definition luma value and corresponding first definition first and second chroma values associated with a pixel in a first definition image, generating via a single matrix multiplication a second definition luma value and corresponding second definition first and second chroma values for a corresponding pixel in a second definition image;

determining whether color space values associated with said second definition luma and first and second chroma values are within a valid color space region, if so, no modification of said second definition first and second chroma values is required, if not, modifying said second definition first and second chroma values in accordance with prescribed criteria based on a first modification factor;

determining said first modification factor based on a prescribed relationship of at least one of said color space values relative to a predetermined valid region; and modifying said second definition first and second chroma values in accordance with a determined second modification factor, said modification of said second definition first and second chroma values being iterated a predetermined number of iterations, and wherein said modification of said second definition first and second chroma values is based on a relationship dependent on whether a prescribed factor has a value inside or outside a valid color space region, said modification being effected on each of said iterations.

2. The method as defined in claim 1 wherein said first definition is standard definition and said second definition is high definition an said matrix multiplication is of the form $$\begin{bmatrix} Yh \\ Pr \\ Pb \end{bmatrix} = \begin{bmatrix} 64 \\ 512 \\ 512 \end{bmatrix} + \begin{bmatrix} 1.0000 & -0.2127 & -0.1181 \\ 0.0 & 1.0251 & 0.0744 \\ 0.0 & 0.1152 & 1.0187 \end{bmatrix} \cdot \begin{bmatrix} Ys & -64 \\ Cr & -512 \\ Cb & -512 \end{bmatrix},$$

where Ys is the standard definition luma value, Cr and Cb are the standard definition chroma values, Yh is the high definition luma value and Pr and Pb are the high definition chroma values.

3. The method as defined in claim 1 wherein said first definition is high definition and said second definition is standard definition and said matrix multiplication is of the form $$\begin{bmatrix} Ys \\ Cr \\ Cb \end{bmatrix} = \begin{bmatrix} 64 \\ 512 \\ 512 \end{bmatrix} + \begin{bmatrix} 1.0000 & 0.1961 & 0.1016 \\ 0.0 & 0.9835 & -0.0718 \\ 0.0 & -.01112 & 0.9898 \end{bmatrix} \cdot \begin{bmatrix} Yh & -64 \\ Pr & -512 \\ Pb & -512 \end{bmatrix},$$

where Ys is the standard definition luma value, Cr and Cb are the standard definition chroma values, Yh is the high definition luma value and Pr and Pb are the high definition chroma values.

4. The method as defined in claim 1 wherein said first modification factor is determined in accordance with $$x = \frac{p - X_0}{X_1},$$

p=0 if $X_0+X_1<0$ and p=1023 if $X_0+X_1<1023$, where x is the said first modification factor, $X_0$ is an initial correction factor and $X_1$ is a first correction factor after the initial one.

5. The method as defined in claim 4 wherein said second definition chroma values are modified, if necessary, in accordance with Pr=512+x(Pr−512) and Pb=512+x(Pb−512).

6. The method as defined in claim 1 wherein said second definition first chroma value is modified by a first prescribed value Dr which is determined in accordance with $$Dr = \frac{Pr - 512}{2},$$

where Pr is said second definition first chroma value, and wherein said second definition second chroma is modified by a second prescribed value Db which is determined in accordance with $$Db = \frac{Pb - 512}{2},$$

where Pb is said second definition second chroma value, and said prescribed factor X is modified by a prescribed value Dx which is determined in accordance with $$Dx = \frac{X_1}{2},$$

all during each iteration.

7. The method as defined in claim 6 wherein when X<0 or X<1023, Pr=Pr−Dr,Pb=Pb−Db,X=X−Dx, when 0<X<1023, Pr=Pr+Dr,Pb=Pb+Db,X=X+Dx, and $$Dx = \frac{Dx}{2}, Dr = \frac{Dr}{2}, Db = \frac{Db}{2},$$

on each iteration.

8. The method as defined in claim 6 wherein when 0<X+Dx<1023, which is inside color space region [0, 1023] but not on the boundary, then Pr=Pr+Dr,Pb=Pb+Db,X=X+Dx, else Pr=Pr,Pb=Pb,X=X, and $$Dx = \frac{Dx}{2}, Dr = \frac{Dr}{2}, Db = \frac{Db}{2},$$

during each iteration.

9. Apparatus for use in color space conversion between first definition images and second definition images comprising the steps of:

a matrix multiplier responsive to a first definition luma value and corresponding first definition first and second chroma values associated with a pixel in a first definition image, to generate via a single matrix multiplication a second definition luma a value and corresponding second definition first and second chroma values for a corresponding pixel in a second definition image;

a detector to determine whether color space values associated with said second definition luma and first and second chroma values are within a valid color space region, if so, no modification of said second definition first and second chroma values is required, if not, modifying said second definition first and second chroma values in accordance with prescribed criteria based on at least one modification factor;

said first modification factor being determined based on a prescribed relationship of at least one of said color space values relative to a predetermined valid region; and a modification unit to modify said second definition first and second chroma values in accordance with a determined second modification factor, said modification of said second definition first and second chroma values being iterated a predetermined number of iterations, and wherein said modification of said second definition first and second chroma values is based on a relationship dependent on whether a prescribed factor has a value inside or outside a valid color space region, said modification being effected on each of said iterations.

10. The apparatus as defined in claim 9 wherein said first definition is standard definition and said second definition is high definition and said matrix multiplier effects the matrix multiplication $$\begin{bmatrix} Yh \\ Pr \\ Pb \end{bmatrix} = \begin{bmatrix} 64 \\ 512 \\ 512 \end{bmatrix} + \begin{bmatrix} 1.0000 & -0.2127 & -0.1181 \\ 0.0 & 1.0251 & 0.0744 \\ 0.0 & 0.1152 & 1.0187 \end{bmatrix} \cdot \begin{bmatrix} Ys & -64 \\ Cr & -512 \\ Cb & -512 \end{bmatrix},$$

where Ys is the standard definition luma value, Cr and Cb are the standard definition chroma values, Yh is the high definition luma value and Pr and Pb are the high definition chroma values.

11. The apparatus as defined in claim 9 wherein said first definition is high definition and said second definition is standard definition and said matrix multiplier effects the matrix multiplication $$\begin{bmatrix} Ys \\ Cr \\ Cb \end{bmatrix} = \begin{bmatrix} 64 \\ 512 \\ 512 \end{bmatrix} + \begin{bmatrix} 1.0000 & 0.1961 & 0.1016 \\ 0.0 & 0.9835 & -0.0718 \\ 0.0 & -.01112 & 0.9898 \end{bmatrix} \cdot \begin{bmatrix} Yh & -64 \\ Pr & -512 \\ Pb & -512 \end{bmatrix},$$

where Ys is the standard definition luma value, Cr and Cb are the standard definition chroma values, Yh is the high definition luma value and Pr and Pb are the high definition chroma values.

12. The apparatus as defined in claim 9 wherein said first modification factor is determined in accordance with $$x = \frac{p - X_0}{X_1},$$

p=0 if $X_0+X_1$<0 and p=1023, if $X_0+X_1$>1023, where x is the said first modification factor, $X_0$ is an initial correction factor and $X_1$ is a first correction factor after the initial one.

13. The apparatus as defined in claim 12 wherein said second definition chroma values are modified, if necessary, in accordance with Pr=512+x(Pr+512)and Pb=512+x(Pb−512).

14. The apparatus as defined in claim 9 wherein said second definition first chroma value is modified by a first prescribed value Dr which is determined in accordance with $$Dr = \frac{Pr - 512}{2},$$

where Pr is said second definition first chroma value, and wherein said second definition second chroma is modified by a second prescribed value Db which is determined in accordance with $$Db = \frac{Pb - 512}{2},$$

where Pb is said second definition second chroma value, and said prescribed factor X is modified by a prescribed value Dx which is determined in accordance with $$Dx = \frac{X_1}{2},$$

all during each iteration.

15. The apparatus as defined in claim 14 wherein when X<0 or X<1023, Pr=Pr−Dr,Pb=Pb−Db,X=X−Dx, when 0<X<1023, Pr=Pr+Dr,Pb=Pb+Db,X=X+Dx, and $$Dx = \frac{Dx}{2}, Dr = \frac{Dr}{2}, Db = \frac{Db}{2},$$

on each iteration.

16. The apparatus as defined in claim 14 wherein when 0<X+Dx<1023, which is inside color space region [0, 1023] but not on the boundary, then Pr=Pr+Dr,Pb=Pb+Db,X=X+Dx, else Pr=Pr,Pb=Pb,X=, and $$Dx = \frac{Dx}{2}, Dr = \frac{Dr}{2}, Db = \frac{Db}{2},$$

during each iteration.

* * * * *